April 25, 1950 A. RANK 2,505,065
HOLLOW ARTICLE HOLDING APPARATUS FOR PRINTING MACHINES
Filed April 11, 1944 2 Sheets-Sheet 1

INVENTOR
A. RANK
BY
E.R. Nowlan
ATTORNEY

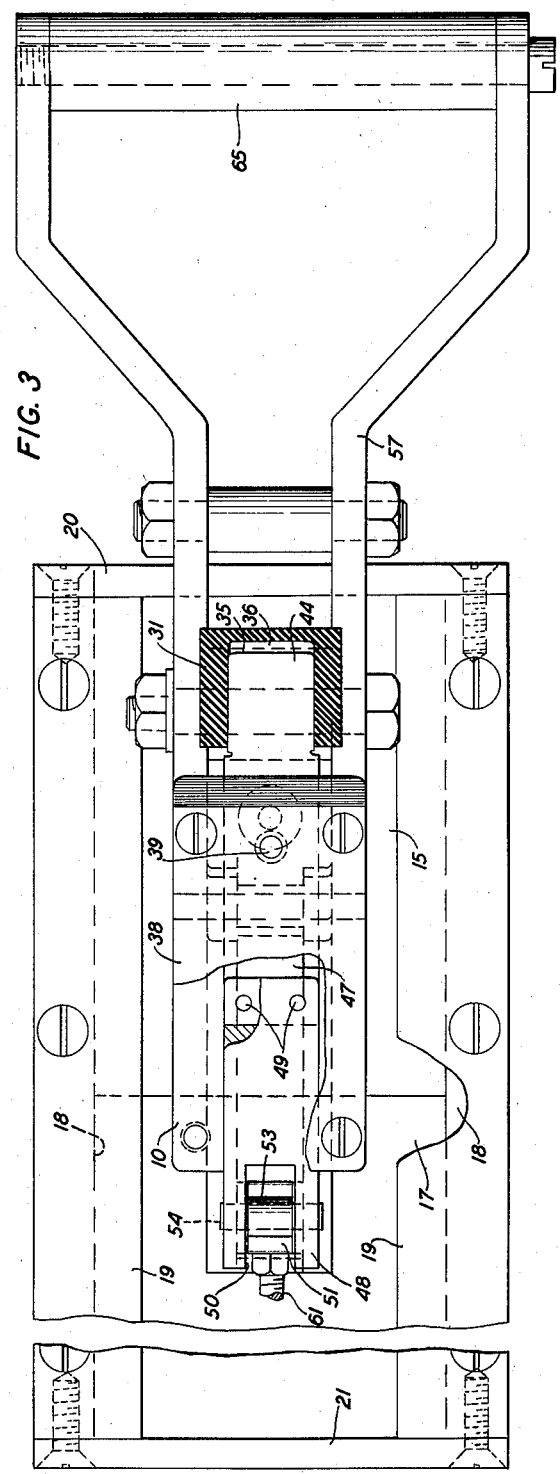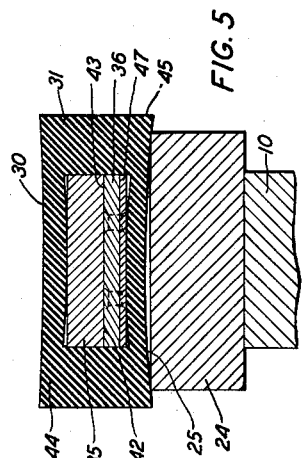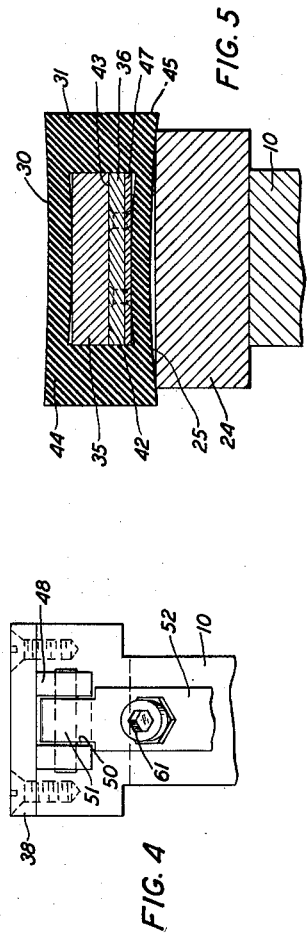

Patented Apr. 25, 1950

2,505,065

UNITED STATES PATENT OFFICE 2,505,065

HOLLOW ARTICLE HOLDING APPARATUS FOR PRINTING MACHINES

Anton Rank, New York, N. Y., assignor to Western Electric Company, Incorporated, New York, N. Y., a corporation of New York Application April 11, 1944, Serial No. 530,574

4 Claims. (Cl. 101—407)

This invention relates to article holding apparatus, and more particularly to apparatus for holding articles to be embossed.

In the manufacture of hollow articles, such as covers or containers for electrical units, formed of moldable materials, it is desirable to emboss or otherwise form identification markings or other data on certain of the faces of these articles. Due to the brittle nature of such articles, it is important that they be suitably supported against breakage during the embossing operations. Furthermore, it has been found, in some instances, that opposing walls of articles of this type become bowed inwardly subsequent to the molding operations in which they are formed, thus adding to the difficulty of holding such articles satisfactorily against possible breakage during the embossing process.

An object of the invention is to provide a holding apparatus which is simple in structure, readily operable, and highly efficient in holding articles of varied contours.

With this and other objects in view, the invention comprises an article holding apparatus including companion elements receivable in a hollow article when in their loading positions and formed to cause their opposing outer surfaces to move away from each other during relative movement of the elements to hold the article against displacement thereon.

Other objects and advantages will be apparent from the following detailed description when considered in conjunction with the accompanying drawings, wherein Fig. 1 is a fragmentary vertical sectional view of the apparatus shown in the loading position;

Fig. 3 is a fragmentary top plan view of the apparatus shown in the loading position;

Fig. 4 is a fragmentary end elevational view taken along the line 4—4 of Fig. 1, and Fig. 5 is an enlarged fragmentary sectional view taken along the line 5—5 of Fig. 1.

Figure 1:
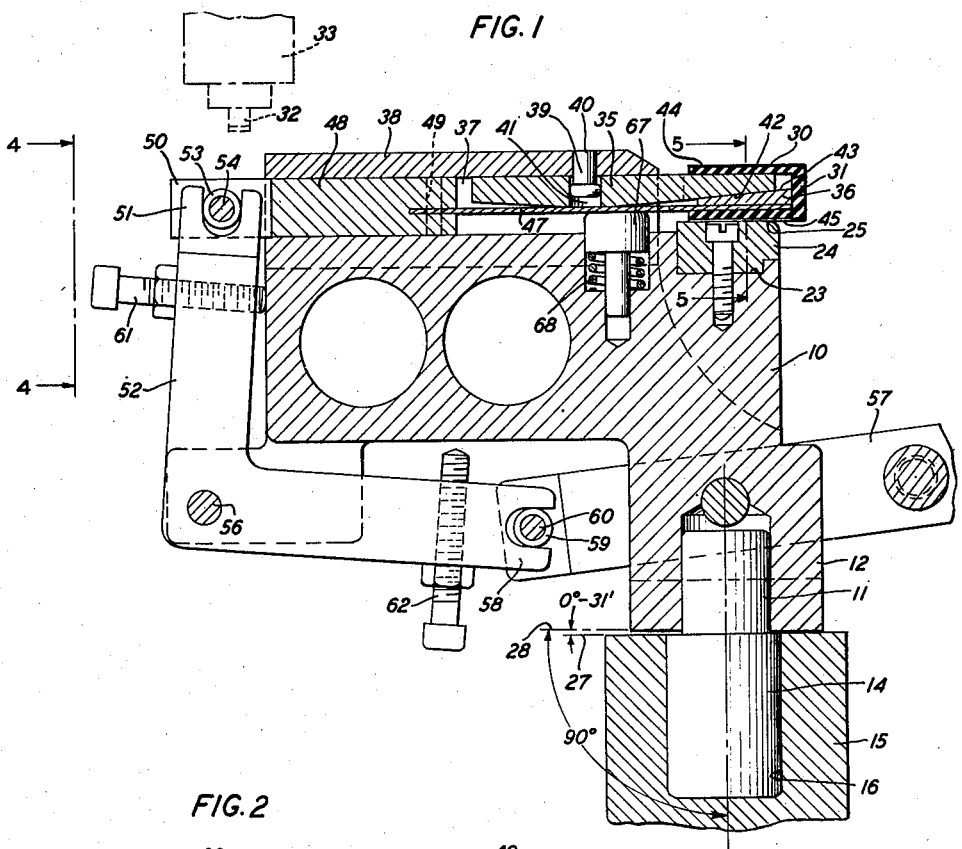

Referring now to the drawings, reference numeral 10 designates a body having an aperture 11 in a downwardly projecting portion 12 thereof, wherein a mounting pin 14 is fixedly disposed, this pin forming connection between the body 10 and a carriage 15, the latter having an aperture 16 therein for the pin 14. The portion of the carriage 15 shown in Fig. 1 is integral with a plate-like portion, shown in Fig. 3, which is movably disposed upon a suitable support 17 between guides 18. Retaining plates 19 in this embodiment are removably disposed upon the guides 18 and assist the guides in retaining the carriage 15 for movement in a given path between the loading position shown in Figs. 1 and 3 and the holding or operating position shown in Fig. 2. A stop 20, having its ends fixed to the guides 18, serves as an abutment for the carriage to locate the carriage in the loading position. A similar stop 21, having its ends fixed to the opposite ends of the guides 18, serves also as an abutment for the carriage 15 to locate the carriage in the holding or operating position.

The body 10 is recessed, as at 23, to receive an anvil 24, an upper or article supporting surface 25 of which is to be disposed in a given plane with respect to a true horizontal plane. The angular relationship of the surface 25 with respect to a true horizontal plane is determined through the mounting of the body 10 on the carriage 15. This is illustrated by line 27, which represents a true horizontal plane. Line 28 lies in a plane with the meeting surfaces of the body 10 and the carriage 15 and, in the present embodiment, is at an angle of thirty-one minutes (31') from the line or plane 27, namely the true horizontal plane. Furthermore, the center line of the pin 14 is at right angles with respect to the line 28, thus causing positioning of the upper surface 25 of the anvil at an angle of thirty-one minutes (31') with respect to the true horizontal plane. This will make possible the positioning of an upper surface 30 of an article 31, upon which markings are to be formed, in the true horizontal plane at right angles with respect to the center line of a forming tool or element 32 and a reciprocable chuck 33 in which it is carried. The variations in the positions of the surfaces 25 and 30 allow for the known variations in the planes of the opposing sides of the article, namely the side or surface 30, upon which markings are to be formed and the opposing side resting upon the surface 25 of the anvil. These variations include the draft necessary for the removal of the molded article from its mold.

Figure 2:
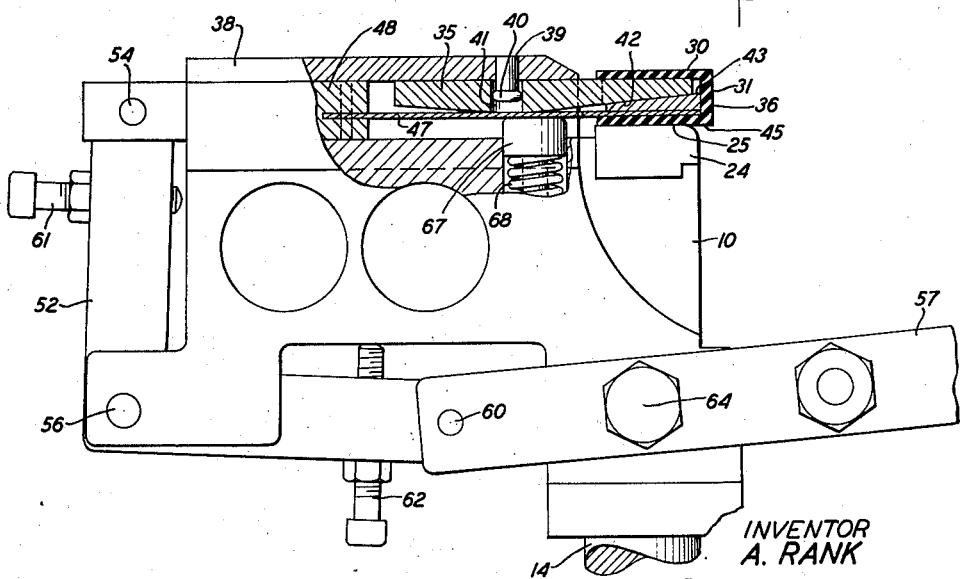
Fig. 2 is a fragmentary side elevational view of the apparatus shown in the loading position.

The holding means for the article 31 includes elements 35 and 36. The element 35 is disposed in a longitudinal groove 37 in the body 10, the upper portion of the groove being closed by a cover plate 38 mounted upon the body as illustrated in Fig. 3. A pin 39, carried by the cover 38, has a rounded head 40 which extends downwardly into an aperture 41 of the element 35, to hold the element against longitudinal movement and serve as a floating support for the element, allowing it to rock thereon in the groove 37. A forward under surface 42 of the element 35 is tapered as illustrated in Figs. 1 and 2 and cooperates with a similarly tapered surface 43 of the element 36, to cause their outer surfaces 44 and 45 to move outwardly during relative movement of the elements. In the present embodiment the outer surface 45, which is herein considered as a part of the element 36, includes a resilient support 47 for the element 36.

The means to cause relative movement of the elements 35 and 36 includes a reciprocable member 48 movably disposed in the groove 37 beneath the cover 38 and having its forward end fixed, as at 49, to the resilient support 47. The outer end of the member 48 has a slot 50 therein to receive a forked end 51 of a bellcrank lever 52, a roller 53, carried by a pin 54 mounted in the end portions of the member 48, serving to operatively connect the bellcrank lever with this member. The lever 52 is pivotally supported, at 56, and has its other end pivotally connected to an actuable hand lever 57. The connection between the bellcrank lever and the hand lever is identical with the connection between the other end of the lever and the reciprocable member 48. In other words, a forked end 58 straddles a roller 59 which is supported by a pin 60, the latter being carried by the hand lever 57. The movement of the bellcrank lever in a clockwise direction causes movement of the element 36 into its loading position, the extent of this movement being controlled by an adjustable stop screw 61. In a like manner the movement of the element 36 into the holding position is under the control of a variable stop screw 62, to control the counterclockwise movement of the bellcrank lever.

The hand lever 57 is of the contour shown in Fig. 3 and is pivotally supported at 64, the latter being carried by the body 10. A handle portion 65 is adapted to be gripped by the operator for use in the actuation of the apparatus.

Returning now to the elements 35 and 36, a spring pressed plunger 67 is disposed in an aperture 68 of the body 10 and is positioned to engage the resilient support 47 adjacent the pin 39, or a short distance in front thereof, to normally hold the elements positioned above the anvil 24 so that the article 31 may be readily moved upon the elements.

Considering now the operation of the apparatus, let it be assumed that the apparatus is in the position shown in Figs. 1 and 3, namely the loading position. In this position the element 36 has been moved outwardly, and due to the resilient nature of the support 47 aided by the spring pressed plunger 67, the surface 45 has been moved upwardly due to the effect of the relative movement of the tapered surfaces 42 and 43. The combined thickness of the holding means, namely the elements 35 and 36, has been reduced through this action, making it possible for the article 31 to be readily positioned on the elements, as illustrated. This reduction in thickness of the elements is sufficient to allow articles to be placed thereon which have bowed sides, as illustrated in Fig. 5. The distance the article is disposed upon the elements is controlled by the element 36. However, during the movement of the element 36 inwardly relative to the element 35, the article will follow the element 36 to the end of its travel, this being due to the greater frictional contact area between the surface 45 of the element 36 engaging the article as compared to the contact area between the surface 45 of the element 35 and the article.

After the article has been disposed upon the elements, the operator may complete two operations or functions through the aid of the hand lever 57. The hand lever is disposed at a position with respect to the operator, so that during a movement by the operator's hand, gripping the handle 65, to move the apparatus with the carriage 15 from the forward or loading position to the rearmost or operating position, the natural pressure or downward movement applied to the handle will cause movement of the hand lever clockwise about its pivot 64 to cause relative movement of the elements 35 and 36. This clockwise movement of the hand lever 57 moves the bellcrank lever 52 counterclockwise, limited by the stop screw 62, to move the reciprocable member 48 to the left (Fig. 1) and thus move the element 36, causing, through the association of the tapered surfaces 42 and 43, relative movement of the outer surfaces 44 and 45 of the elements to create a gripping or holding effect between the elements and the article. During this relative movement of the elements, any sagging or bowed condition in the sides of the article will be removed, straightening the surfaces thereof so that the lower surface of the article will rest firmly upon the anvil 24 and the upper surface 30 will lie in a plane parallel with the surface of the forming tool 32. When the apparatus is in the operating position, where the article is firmly held against displacement upon the anvil 24, the desired portion of the article to receive the markings will be disposed in general alignment with the tool 32 so that, during a reciprocal movement of the tool through the aid of its chuck 33, the embossing or marking process may be performed.

After the completion of the embossing operation, the operator may move the apparatus forwardly on a support 17 aided by the guides 18, to the loading position, determined by the stop 29. During this movement of the apparatus through the aid of the hand lever 57, there is a natural tendency to pull upwardly upon the handle portion 65, resulting in a counterclockwise movement of the hand lever, and a clockwise movement of the bellcrank lever 52, controlled by the stop screw 61, to move the member 48 with the element 36 forwardly to release the holding effect of the elements in the article and to free the article so that it may be readily removed from the apparatus. At this time another article may be disposed in place and the operating cycle continued.

The holding effect of the elements on the article may be varied by varying either or both of the adjustable screws 61 and 62. This is desirable to provide a completely solid structure between the anvil and the tool, in addition to reconditioning the walls of the article should there be variations in their contours, to thus completely support the sides of the article and eliminate possible breakage thereof when subjected to the force of the tool necessary for the embossing operation. Furthermore, with the floating effect of the element 35 and the resilient support for the element 36, the holding structure with the article may find its location upon the anvil when subjected to the force of the tool.

Although specific improvements of the invention have been shown and described, it will be understood that they are but illustrative and that various modifications may be made therein without departing from the scope and spirit of this invention as defined by the appended claims.

What is claimed is:

1. An apparatus for holding a hollow article while the outer surface of one wall thereof is marked by a marking unit disposed at an operating position, the holding apparatus comprising a body, a carriage to support the body for movement between a loading position and the operating position, companion elements relatively movable with respect to each other, carried by the body and having outer surfaces, to engage opposing inner walls of a hollow article, and parallel inner surfaces extending diagonally from their respective outer surfaces whereby relative movement of the elements toward their receiving positions will free their outer surfaces to move toward each other and relative movement of the elements toward their holding positions will cause their outer surfaces to move away from each other against the said opposing walls of the article to firmly hold the article and should the said walls be bowed inwardly, to force them outwardly in substantially parallel planes, an actuable handle carried by the body for use in moving the body between the loading position and the marking position, and means operatively connecting the handle and the elements and operated by actuation of the handle to cause relative movement of the elements.

2. An apparatus for holding a hollow article while the outer surface of one wall thereof is marked by a marking unit disposed at an operating position, the holding apparatus comprising a body, a carriage to support the body for movement between a loading position and the operating position, companion elements relatively movable with respect to each other, carried by the body and having outer surfaces, to engage opposing inner walls of a hollow article, and parallel inner surfaces extending diagonally from their respective outer surfaces whereby relative movement of the elements toward their receiving positions will free their outer surfaces to move toward each other and relative movement of the elements toward their holding positions will cause their outer surfaces to move away from each other against the said opposing walls of the article to firmly hold the article and should the said walls be bowed inwardly, to force them outwardly in substantially parallel planes, an actuable handle carried by the body for use in moving the body between the loading position and the marking position, and means operatively connecting the handle and the elements and operated by actuation of the handle to move the body into the operating position to cause relative movement of the elements into their holding positions.

3. An apparatus for holding a hollow article while the outer surface of one wall thereof is marked by a marking unit disposed at an operating position, the holding apparatus comprising a body, a carriage to support the body for movement between a loading position and the operating position, companion elements relatively movable with respect to each other, carried by the body and having outer surfaces, to engage opposing inner walls of a hollow article, and parallel inner surfaces extending diagonally from their respective outer surfaces whereby relative movement of the elements toward their receiving positions will free their outer surfaces to move toward each other and relative movement of the elements toward their holding positions will cause their outer surfaces to move away from each other against the said opposing walls of the article to firmly hold the article and should the said walls be bowed inwardly, to force them outwardly in substantially parallel planes, an actuable handle carried by the body for use in moving the body between the loading position and the marking position, and means operatively connecting the handle and the elements and, operated by actuation of the handle to move the body into the operating position to cause relative movement of the elements into their holding positions, and operated by actuation of the handle to move the body into the loading position to cause relative movement of the elements into their receiving positions to free the article.

4. An apparatus for holding a hollow article while the outer surface of one wall thereof is marked by a marking unit disposed at an operating position, the holding apparatus comprising a body, a carriage to support the body for movement between a loading position and the operating position, companion elements relatively movable with respect to each other, carried by the body and having outer surfaces, to engage opposing inner walls of a hollow article, and parallel inner surfaces extending diagonally from their respective outer surfaces whereby relative movement of the elements toward their receiving positions will free their outer surfaces to move toward each other and relative movement of the elements toward their holding positions will cause their outer surfaces to move away from each other against the said opposing walls of the article to firmly hold the article and should the said walls be bowed inwardly to force them outwardly in substantially parallel planes, an actuable handle carried by the body for use in moving the body between the loading position and the marking position, means operatively connecting the handle and the elements, operated by actuation of the handle to move the body into operated position to cause relative movement of the elements into their holding positions, and operated by actuation of the handle to move the body into the loading position to cause relative movement of the elements into their receiving positions to free the article, an anvil disposed beneath the elements and carried by the body to support the article during the marking operation.

ANTON RANK.

REFERENCES CITED

The following references are of record in the file of this patent:

UNITED STATES PATENTS

| Number | Name | Date |
|---|---|---|
| 102,257 | Hall et al. | Apr. 26, 1870 |
| 741,915 | Kirschbaum | Oct. 20, 1903 |
| 1,553,529 | Hayden | Sept. 15, 1925 |
| 1,925,236 | Doyle et al. | Sept. 5, 1933 |
| 2,009,098 | Smith | July 23, 1935 |
| 2,202,762 | Freed | May 28, 1940 |
| 2,369,172 | Nordquist | Feb. 13, 1945 |